G. A. PARMENTER.

LIFE GUARD FOR RAILWAY CARS.

APPLICATION FILED SEPT. 26, 1910.

Reissued Nov. 22, 1910.

13,172.

2 SHEETS—SHEET 1.

Attest:

Edwd L. Tolson

Edward N. Sartu

Inventor:

George A. Parmenter, by Spear Middleton Donaldson & Shum

Atty's.

THE NORRIS PETERS CO., WASHINGTON, D. C.

G. A. PARMENTER.

LIFE GUARD FOR RAILWAY CARS.

APPLICATION FILED SEPT. 26, 1910.

Reissued Nov. 22, 1910.

13,172.

2 SHEETS—SHEET 2.

Attest:

Edwd C. Johson.

Edward A. Sutton.

Inventor:

George A. Parmenter by Spear Middleton Donaldson & Spear

Atty's.

THE NORRIS PETERS CO., WASHINGTON, D. C.

UNITED STATES PATENT OFFICE.

GEORGE A. PARMENTER, OF CAMBRIDGE, MASSACHUSETTS.

LIFE-GUARD FOR RAILWAY-CARS.

13,172. Specification of Reissued Letters Patent. Reissued Nov. 22, 1910.

Original No. 955,678, dated April 19, 1910, Serial No. 536,738. Application for reissue filed September 26, 1910. Serial No. 583,976.

*To all whom it may concern:*

Be it known that I, GEORGE A. PARMENTER, a citizen of the United States, residing at Cambridge, Massachusetts, have invented certain new and useful Improvements in Life-Guards for Railway-Cars, of which the following is a specification.

My present invention relates to improvements in fenders or guards for railway cars of the type known as trip and drop scoops, and is particularly designed for use on double or swinging truck cars.

In a prior application filed by me in the United States Patent Office on the 27th day of March, 1909, Serial No. 486,136, I have shown and described an improved fender of the trip and drop scoop type which has proved eminently satisfactory, but I have found that some roads have their car platforms provided with fixtures or attachments that interfere to a greater or less extent with the use of a centrally disposed locking bar and resetting devices.

I have aimed in devising my present invention to provide a fender particularly adapted to cars of this character, and one in which extreme simplicity and durability are attained, and I have also aimed to support the basket in such a way as to relieve it as far as possible of the shocks or jars encountered by the truck in passing over rough or uneven tracks.

With these and other objects in view the invention comprises the novel features of construction and arrangement and combination of parts hereinafter described and particularly pointed out in the appended claims.

A fender constructed in accordance with my invention is illustrated in the accompanying drawings, in which:—

Figure 1:
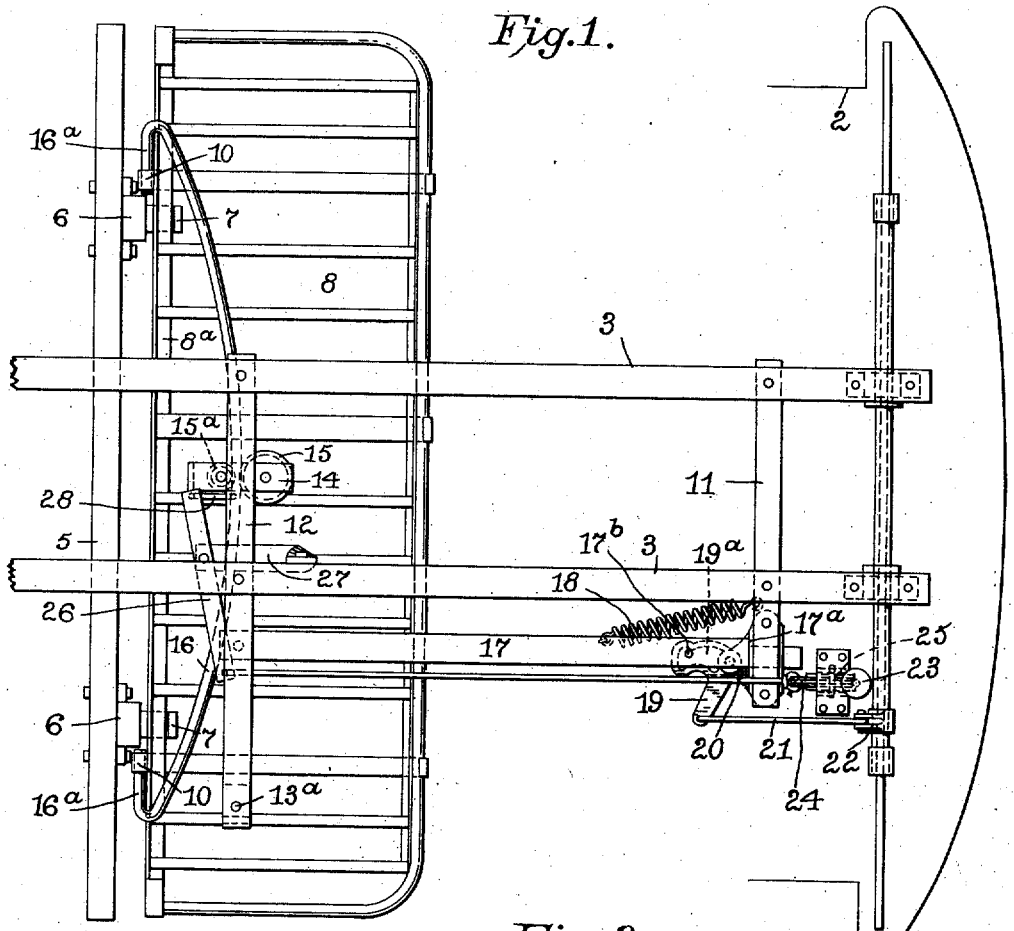
Figure 2:
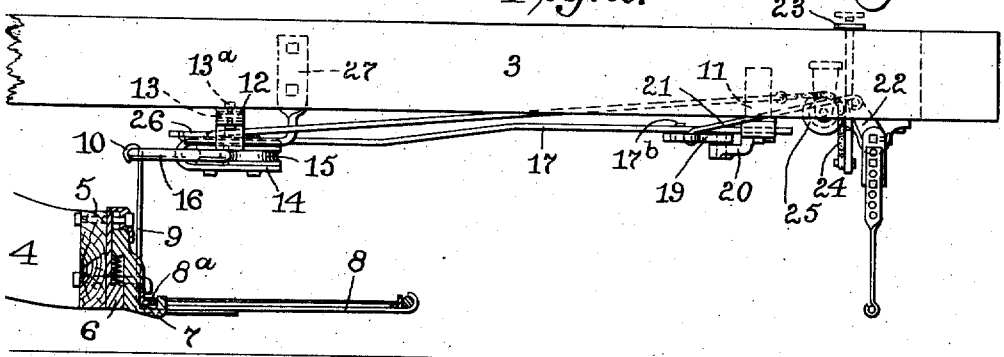
Figure 3:
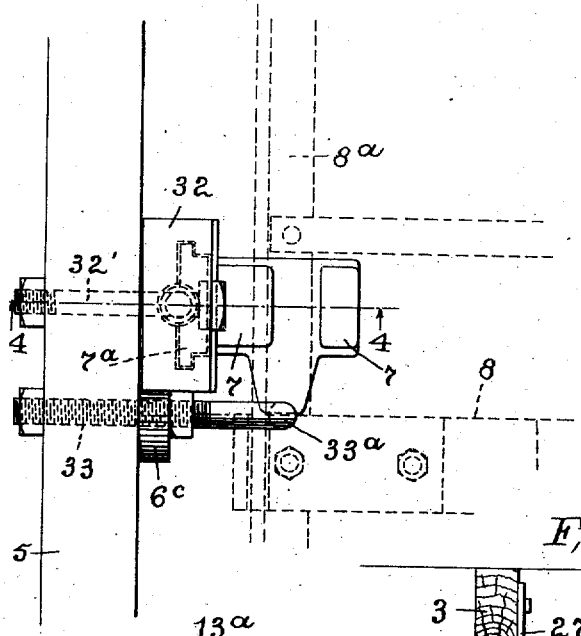
Figure 4:
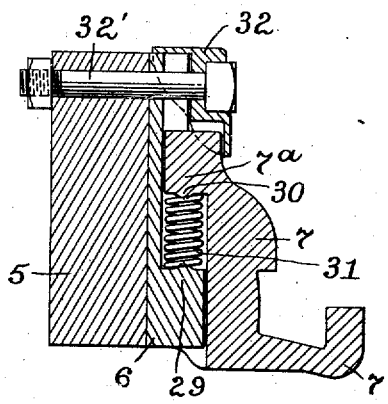
Figure 7:
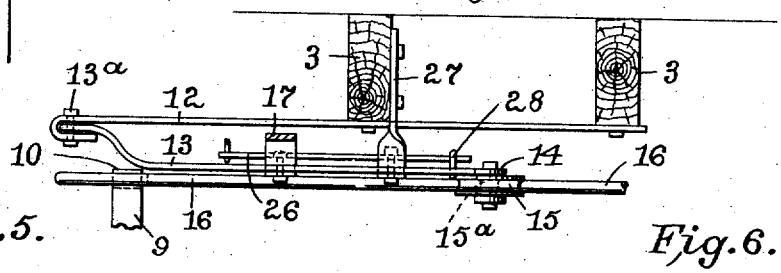
Figure 5:
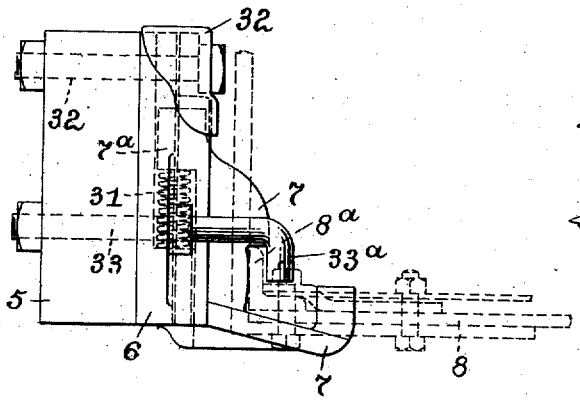
Figure 6:
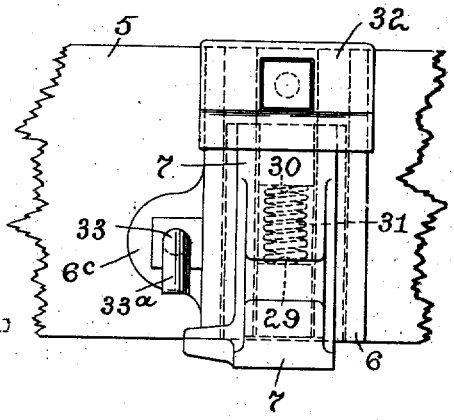

Figure 1 is a plan view showing a sufficient portion of a car platform and sills in outline to illustrate the application of the fender thereto. Fig. 2 is a side elevation. Fig. 3 is an enlarged plan view of one of the hangers for the scoop or basket. Fig. 4 is a section on line 4, 4, of Fig. 3. Fig. 5 is a side elevation of the same, and Fig. 6 a front view. Fig. 7 is a fragmental front view of parts of the device.

Referring by reference characters to this drawing the numeral 2 designates the car platform and 3 the sills. The swiveled truck frame is indicated at 4 having the usual cross bar or pilot board 5 provided with brackets or hangers 6 with hooked or recessed portions 7 in which the rear cross bar or member 8[a] of the scoop or basket 8 is pivotally or rotatably seated.

The scoop is provided with upwardly extending arms 9, to the upper ends of which arms are pivotally connected the ends of a curved bar 16, which I call a "radius bar" and which is curved or formed in the shape of the arc of a circle which has for its center the pivotal axis of the truck. The ends of the bar are preferably turned inward, as shown at 16[a], so as to give a maximum length to the curved portion, and the pivotal connection is preferably effected by mounting these inwardly turned portions in eyes 10 in the upper ends of the arms 9.

Secured to the under sides of the sills 3 are front and rear metal bars 11 and 12. The extreme end of the rear bar 12, which is longer than the front bar, is doubled upon itself to form a recess in which is pivotally mounted the end of a rocking lever 13 as indicated at 13[a]. The main portion of this rocking lever is depressed below its pivot to bring it approximately on a level with the upper ends of the arms 9, and it carries at its inner end a U-shaped or forked bracket 14, between the arms of which are journaled two anti-friction rollers 15 and 15[a] which engage or bear against the front and rear sides of the curved or radius bar 16.

A sliding locking bar 17 has its rear end pivotally connected to the lever 13 considerably to one side of the center of the car platform while its front end is slidingly supported by a guide supported by the bar 11.

The locking bar 17 has a laterally extending shoulder or offset 17[a] which is designed to rest behind and engage a shoulder formed preferably by the edge of the guide as indicated in Fig. 1, in which position the locking bar will hold the lever 13 pressed backward and through the bracket 14 and rollers and radius bar, hold the basket or scoop elevated in the position shown in Fig. 2. In order to hold the bar 17 with its shoulder in locking engagement with the guide, I provide a spring 18 which has one end connected to the bar 17 and its other end to the bar 11, the spring extending diagonally so that it not only tends to swing the bar 17 toward the center of the car and bring and hold its shoulder into locking engagement with the guide, but also, when the bar is moved to disengage said shoulder, tends to draw the bar forward and thus assist the action of gravity in causing the scoop to drop quickly.

In order to impart a lateral motion to the bar to thus unlock or release it, a bell crank lever 19 is pivoted on a bracket arm 20, one arm of this bell crank lever being connected by a link or rod 21 with an upwardly extending arm 22 carried by the top bar of the swinging trip frame near one side or end thereof. The other arm of the bell crank lever is provided with an elongated slot 19[a] which is engaged by a pin or projection 17[b] on the bar 17. Normally the pin lies near the rear end of the slot and when the trip frame is swung rearwardly the pull upon the link will rock the bell crank lever and cause the slotted arm to swing outward toward the side of the car, and through the pin connection, pull the bar 17 sufficiently to one side to disengage the locking shoulder.

The slot in the arm of the bell crank is made of sufficient length to allow full forward movement to the bar to drop the scoop or basket. The slot is made of such a width as will permit the trip frame to be swung forward without binding on the pin.

For the purpose of resetting the scoop or basket, I provide a depressible treadle 23 in convenient reach of the motorman, the lower end of which is connected to a flexible element such as a chain 24 passing over a pulley 25 and connected (preferably by a rod) with one end of a lever 26, which is pivoted on a bracket 27 depending from the sill of the car. The other end of this lever is connected by a link 28 with the forked bracket 14, so that as the treadle is depressed the lever will swing to pull the forked bracket back and through its connection with the curved bar cause the scoop to be lifted. At the same time the locking bar 17 is drawn rearwardly until its shoulder is brought into locking engagement with the edge of the guide and the parts held in reset position.

In order to relieve the basket as far as possible of jars or shocks due to passing over rail joints or rough tracks, I provide the special form of hanger shown more in detail in Figs. 3 to 6. In this the bracket 6 is provided with a vertical guideway having overhanging flanges in which guide way is slidably held the T shaped head 7[a] of the hanger 7.

The guideway of the bracket 6 has a closed lower end or abutment as indicated at 29, and the hanger 7 has a recessed rear face provided with a closed upper end or abutment 30 as clearly shown in Fig. 4. Within this recess and between the abutments is located a helical spring 31 which causes the hanger to be elastically supported.

The hanger is retained in the guideway by a cap 32 fitted thereon, the upper end of which is secured in place by a bolt 32′ which passes through the cap, bracket and pilot board as shown.

The rear bar 8[a] of the basket is preferably constructed of angle iron as shown and is retained in the recess of the hanger in which it pivots by the angularly turned end 33[a] of a bolt 33 which passes through a part of the bracket, such as an ear 6[c] and the pilot board.

Having thus described my invention what I claim is:—

1. The combination with a car body and swiveled truck frame, of a scoop pivotally supported by the truck frame, a curved bar connected with the scoop, a rocking lever pivotally supported from the car body, anti-friction means carried by the rocking lever and engaging said curved bar, means for normally holding said lever in position to hold the scoop elevated, and tripping means.

2. The combination with a car body and swiveled truck frame, of a scoop pivotally carried by the truck frame, and having upwardly extending arms, a curved bar carried by said arms, a lever pivotally supported from the car body, means effecting a sliding connection between said lever and said curved bar, a longitudinally movable locking bar connected at its rear end to said lever, means normally locking said movable bar against movement and tripping means.

3. The combination with a car body and swiveled truck frame, of a scoop pivotally carried by the truck frame and having upwardly extending arms, a curved bar carried by said arms, a lever pivotally supported from the car body, means effecting a sliding connection between said lever and said curved bar, a longitudinally movable locking bar, pivotally connected at its rear end to said lever and having on its side a lug or shoulder, a guide for the forward end of said bar having a co-acting shoulder, a spring tending to swing said bar laterally to hold said shoulders in engagement, and tripping means for swinging said bar against the tension of the spring to disengage said shoulders.

4. The combination with a car body and truck frame of a scoop pivotally connected to the truck frame, a lever pivotally supported from the car body and having an operative connection with the scoop, a longitudinally movable bar disposed at one side of the center of the car body and having its rear end pivotally connected to said lever, a guide supported from the car platform in which the forward end of said bar is supported to have a limited swinging movement, said bar and said guide having locking parts adapted to be engaged by said swinging movement, and tripping means for swinging said bar to disengage said parts.

5. The combination with a car body and truck frame, of a scoop pivotally connected to the truck frame, a lever pivotally supported from the car body, and having an operative connection with the scoop, a longitudinally movable bar disposed at one side of the center of the car body and having its rear end connected to said lever by a pivot having a vertical axis, a guide for the forward end of the bar, said guide and said bar having locking parts adapted to be engaged by the lateral movement of said bar, and tripping means for swinging said bar to disengage said parts.

6. The combination with a car body and truck frame, of a scoop pivotally connected to the truck frame, a lever pivotally supported from the car body and having an operative connection with the scoop, a longitudinally movable bar disposed at one side of the center of the car body and having its rear end connected to said lever by a pivot having a vertical axis, a guide for the forward end of the bar, said guide and said bar having locking parts adapted to be engaged by the lateral movement of said bar, a diagonally arranged spring connected at one end to said bar and at the other end with a stationary part carried by the car body.

7. The combination with a car body, and truck frame, of a scoop pivotally connected to the truck frame, a lever pivotally supported from the car body and having an operative connection with the scoop, a longitudinally movable bar disposed at one side of the center of the car body and having its rear end connected to said lever by a pivot having a vertical axis, a guide for the forward end of the bar, said guide and said bar having locking parts adapted to be engaged by the lateral movement of said bar, a diagonally arranged spring connected at one end to said bar and at the other end with the stationary part carried by the car body and tending to bring said locking parts into engagement, a bell crank lever pivotally supported from the car body and in proximity to the bar, said bell crank lever and said bar having the one a slot and the other a pin engaging the slot and a tripping device for rocking said bell crank lever, substantially as described.

8. The combination with a car body and swiveled truck frame, of a scoop pivotally connected to the truck frame, a curved bar carried by the scoop, a lever pivotally supported from the car body and having a part engaging said curved bar with a sliding engagement, a longitudinally movable bar disposed at one side of the center of the car and connected at its rear end with said pivoted lever, locking means for holding said longitudinally movable bar against movement, tripping means for releasing said bar, a pivoted resetting lever carried by the car body, a manually operable device on the car platform and connections between said manually operable device and the resetting lever, said connections being also disposed at one side of the center of the car body.

9. In combination with a car body and its swiveled truck frame, of a scoop pivotally supported from the truck frame and having upwardly extending arms at its rear edge, a curved bar connected with said arms, a lever pivotally connected to the car platform, a bracket carried by said lever, approximately centrally of the car body and having a wheel acting on said curved bar, a longitudinally movable locking bar disposed at one side of the center of the car body and connected at its rear end to said lever, means for locking said bar normally against movement, and a tripping means for tripping said bar, a resetting lever pivotally supported from the car body and having one end operably connected to said first named lever, a manually operable device on the car platform, and connections between said device and the opposite end of the tripping lever, substantially as described.

10. In a wheel guard, a drop scoop, a longitudinally movable locking bar with means at the rear end thereof for normally holding the scoop elevated, said bar being capable of a limited lateral swinging movement and having on its side a lug or shoulder, a guide for the forward end of the bar having a coacting shoulder, a spring tending to swing said bar laterally to hold said shoulders in engagement, and tripping means for swinging said bar laterally against the tension of the spring to disengage said shoulders.

11. In a wheel guard a drop scoop, a longitudinally movable locking bar for normally holding said scoop elevated, said bar being capable of a lateral swinging movement, guiding means for said bar, means whereby the lateral swinging movement of the bar locks and unlocks the same, a spring acting on said bar and tending to swing it laterally in one direction to lock it and also to draw it longitudinally when unlocked, and tripping means for swinging the bar laterally to unlock it to release the scoop.

12. In a wheel guard a drop scoop, a longitudinally movable locking bar with means at the rear end coacting with the scoop for holding said scoop elevated, said bar being capable of a limited lateral swinging movement, a guide for the forward portion of the bar, a lug on the side of the bar arranged to coact with a stationary lug to hold said bar in locking position, a diagonally arranged spring connected at one end to said bar and at the other end to a stationary part and tending to hold said lugs in engagement and also, when the latter are disengaged, to draw the bar forward, and tripping means for swinging the bar laterally to disengage said lugs.

13. In a wheel guard, a drop scoop, a longitudinally movable locking bar with means at the rear end thereof for holding the scoop elevated, said bar being capable of a limited lateral swinging movement, means whereby the lateral swinging movements lock and unlock the bar, a pivoted bell crank lever located in proximity to the bar, said bell crank lever having the one a slot and the other a pin engaging the slot, and a tripping device for rocking said bell crank lever.

14. In a wheel guard a drop scoop, a longitudinally movable locking bar with means at the rear end thereof for holding the scoop elevated, said bar being capable of a lateral swinging movement, a spring tending to swing said bar toward the limit of its movement toward one side, and in locking position, a trip device, and connections whereby the operation of the trip device swings said bar against the tension of the spring into unlocking position.

15. In a wheel guard a drop scoop, a longitudinally movable locking bar with means at the rear end thereof for holding the scoop elevated, said bar being capable of a lateral swinging movement, a spring tending to swing said bar toward the limit of its movement toward one side, and in locking position, a bell crank lever having one arm arranged to coact with a part on the bar, and a trip device connected with said bell crank lever for causing it to swing the bar into unlocking position.

16. The combination with a railway car of a drop scoop carried thereby, a longitudinally movable locking bar supported from the car and capable of a limited horizontal swinging movement for locking and unlocking the same, means at the rear end of said bar for holding the scoop elevated, a bell crank lever pivotally supported from the car and having one arm extending substantially parallel with the bar and provided with an elongated slot, a pin or projection carried by the bar and engaging said slot, said pin resting in the rear end of the slot when the bar is in locking position, the other arm of said bell crank lever extending substantially at right angles to the bar, and a swinging trip frame supported from the front of the car and operatively connected to said other arm of the bell crank lever.

17. Means for supporting the scoops or baskets of car fenders, comprising a bracket adapted to be secured to the truck frame and having a vertical guide way, a hanger vertically movable in said guide way, and a spring located in said guide way and supporting the hanger.

18. In a car fender, the combination with the pilot board of a truck, of a bracket carried by said pilot board and having a vertical guide way with an abutment or shoulder near the lower end, a hanger having a part movably held in said guide way and having a corresponding shoulder, a spring interposed between said shoulders, and a scoop or basket pivotally supported by said hanger.

19. In a car fender, the combination with the pilot board of a truck, of a bracket secured thereto, and having a vertical guide way with overhanging flanges, a hanger having a T shaped part engaging said guide way, a spring in the guide way supporting the hanger, a removable cap closing the upper end of the guide way, and a scoop supported by the hanger, substantially as described.

20. In a car fender, a hanger carried by the pilot board of the truck and having an open recess, a scoop having a rear bar of L shaped angle iron, and a removable bolt having a turned down end engaging one flange of said angle iron.

21. The combination with a car body and swiveled truck frame, of a pair of hangers resiliently supported from the truck frame, a scoop pivotally carried by the hangers and having upwardly extending members, a curved bar hinged to said members, a longitudinally movable locking bar having at its rear end sliding engagement with said curved bar, and tripping means.

GEORGE A. PARMENTER.

Witnesses:

ARTHUR BURNHAM,

JAS. H. WELLS.